Feb. 1, 1944. R. H. SLOAN, JR Re. 22,431

FROZEN FOOD LOCKER UNIT

Original Filed Aug. 22, 1941

INVENTOR
ROLAND HOYT SLOAN, JR.

BY
Marshall & Hawley
ATTORNEYS

Reissued Feb. 1, 1944 Re. 22,431

UNITED STATES PATENT OFFICE 22,431

FROZEN FOOD LOCKER UNIT

Roland Hoyt Sloan, Jr., Atlanta, Ga., assignor of one-half to Roland Hoyt Sloan, Sr., New Brighton, N. Y.

Original No. 2,306,413, dated December 29, 1942, Serial No. 407,962, August 22, 1941. Application for reissue January 16, 1943, Serial No. 472,629

18 Claims. (Cl. 20—1)

This invention relates to frozen food locker units, and particularly to means usable in connection therewith to give access to the lockers.

The temperature in the locker room of frozen food lockers is usually maintained at about zero degrees F. and it is necessary for attendants or users to "bundle up" in fur coats or warm clothing before entering the locker compartment.

This invention has for its salient object to provide means for use in conjunction with locker compartments, so constructed and arranged as to protect the locker user or attendant from exposure to the cold temperature in the compartment.

Figure 1:
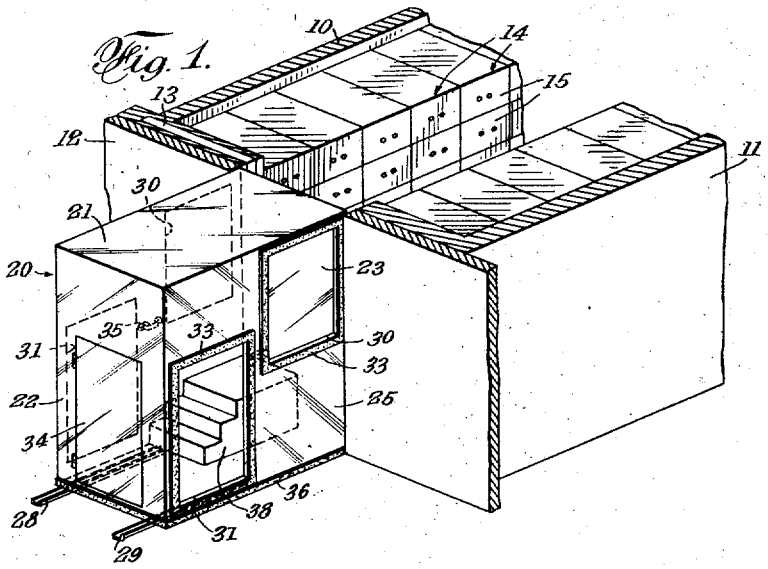
Figure 2:
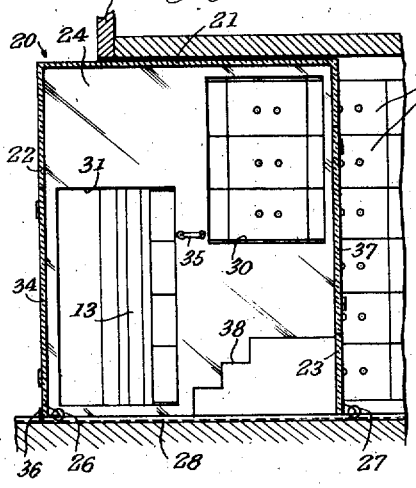
Figure 3:
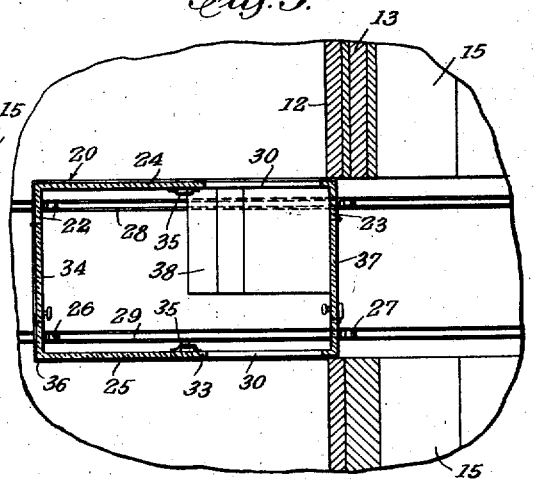

Further objects of the invention will appear from the following specification taken in connection with the drawing which forms a part of this application, and in which Fig. 1 is a perspective view partly broken away showing a portion of a locker compartment and means adapted to enter the passageway in the compartment and provide access to the lockers;

Fig. 2 is a vertical sectional elevation through the protecting cabinet and a portion of the locker compartment; and Fig. 3 is a horizontal section taken through the structure shown in Fig. 2.

In the embodiment of the invention illustrated in the drawing there is shown a portion of a locker compartment comprising side walls 10 and 11, a front end wall 12 having an opening therethrough adapted to be closed and sealed by a door 13. The door as illustrated is shown as slidably mounted, but a hinged door may be used if desired.

As shown, the locker compartment houses a plurality of laterally and vertically disposed rows 14 of stationary lockers 15, the rows being arranged in oppositely facing relation to provide a passageway therebetween. It will be understood that the lockers 15 may be provided with slidable doors to give access thereto.

There is shown in conjunction with the locker compartment a cabinet 20 having a top 21, a front wall 22, rear wall 23 and side walls 24 and 25.

The cabinet is mounted on rollers 26 and 27 which run in channel shaped tracks 28 and 29, the tracks extending into the passageway and guiding the cabinet as it is pushed or drawn into the passageway.

In order to give access to the lockers from the cabinet a pair of openings 30 and 31 are provided in the side walls 24 and 25. The openings 30 give access to the upper lockers and access is obtained to the lower lockers through the openings 31. The cabinet may be formed of transparent material.

In order to seal the cabinet as far as possible against the low temperature in the locker compartment the openings 30 and 31 are surrounded by suitable weather stripping 33.

If desired the bottom of the cabinet may be open so that the user can walk along the floor and push the cabinet into the passageway, handles 35 being provided for this purpose. If the bottom or a portion of the bottom of the cabinet is open, weather stripping 36 is provided around the bottom of the cabinet to prevent the cold air from entering the cabinet.

The rear wall 23 is provided with a door 37 so that the user can walk through the cabinet into the passageway if desired. A door 34 is provided in the front wall.

Furthermore, any suitable propulsion means may be provided to move the cabinet into and out of the passageway if this seems desirable.

The cabinet is also provided with steps 38 to facilitate access to the upper lockers. The steps are preferably slidable or movable in the cabinet.

From the foregoing specification it will be seen that simple, practical and inexpensive means has been provided for accomplishing the purpose set forth and that by means of a cabinet such as that described users may gain access to the lockers without exposing themselves to the low temperatures in the locker compartment.

Although one specific embodiment of the invention has been particularly shown and described, it will be understood that the invention is capable of modification and that changes in the construction and in the arrangement of the various cooperating parts may be made without departing from the spirit and scope of the invention, as expressed in the following claims.

What I claim is:

1. A movable cabinet for use between oppositely facing rows of lockers and comprising a cabinet structure mounted to move between said rows and having lateral openings for providing access to said lockers, and sealing means for protecting said openings and the cabinet from the cold air surrounding the cabinet.

2. In combination, a refrigerator locker room having oppositely facing vertical rows of lockers separated by a passageway, and a cabinet movable into and substantially filling the width of said passageway, said cabinet having lateral openings to provide access to said lockers.

3. In combination, a refrigerator locker room having oppositely facing vertical rows of lockers separated by a passageway, a cabinet movable into and substantially filling the width of said passageway, said cabinet having lateral openings to provide access to said lockers, and sealing means for protecting said openings and the cabinet from the cold air surrounding the cabinet.

4. In combination, a refrigerator locker room having oppositely facing vertical rows of lockers separated by a passageway, a cabinet movable into and substantially filling the width of said passageway, said cabinet having lateral openings to provide access to said lockers, and means for guiding the cabinet in said passageway.

5. In combination, a refrigerator locker room having oppositely facing vertical rows of lockers separated by a passageway, and a rectangular, transparent cabinet movable into and substantially filling the width of said passageway, said cabinet having lateral openings to provide access to said lockers.

6. In combination, a refrigerator locker room having oppositely facing vertical rows of lockers separated by a passageway, a cabinet movable into and substantially filling the width of said passageway, said cabinet having lateral openings to provide access to said lockers and an opening in the bottom so that the user can walk on the room floor and push the cabinet into the passageway, and sealing means around the bottom of the cabinet for preventing cold air from entering the cabinet through the cabinet floor opening.

7. In combination, a refrigerator locker room having oppositely facing vertical rows of lockers separated by a passageway, a cabinet movable into and substantially filling the width of said passageway, said cabinet having lateral openings to provide access to said lockers and an opening in the bottom so that the user can walk on the room floor and push the cabinet into the passageway, sealing means around the bottom of the cabinet for preventing cold air from entering the cabinet through the cabinet floor opening, and sealing means for protecting said openings and the cabinet from the cold air surrounding the cabinet.

8. In combination, a refrigerator locker room having oppositely facing vertical rows of lockers separated by a passageway, and a cabinet movable into and substantially filling the width of said passageway, said cabinet having lateral openings to provide access to said lockers and having a door at the front end thereof to permit the user to pass therethrough into the locker room.

9. In combination, a refrigerator locker room having oppositely facing vertical rows of lockers separated by a passageway, a cabinet movable into said passageway, said cabinet having lateral openings to provide access to said lockers and having a door at the front end thereof to permit the user to pass therethrough into the locker room, and means in the cabinet for enabling the user to reach the upper lockers.

10. In combination, a refrigerator locker room having oppositely facing vertical rows of lockers separated by a passageway, a cabinet movable into said passageway, said cabinet having lateral openings to provide access to said lockers and having a door at the front end thereof to permit the user to pass therethrough into the locker room. and movable means in the cabinet for enabling the user to reach the upper lockers.

11. A movable cabinet for use between oppositely facing rows of lockers and comprising a cabinet having lateral openings to give access to the lockers and doors at the end of the cabinet to permit access thereto or exit therefrom.

12. A movable cabinet for use between oppositely facing rows of lockers and comprising a cabinet having lateral openings to give access to the lockers and doors at the end of the cabinet to permit access thereto or exit therefrom, and sealing means for protecting said openings and the cabinet from the cold air surrounding the cabinet.

13. In combination, a refrigerator locker room, a plurality of laterally and vertically disposed lockers therein with the faces of said lockers in a common vertical plane, and a cabinet in said refrigerator room adapted to enclose a user and having a vertical wall constructed with an opening to provide access to the lockers, said cabinet being movable to bring said wall into sealing abutment with the faces of said lockers.

14. In combination, a refrigerator locker room, a plurality of laterally and vertically disposed lockers therein with the faces of said lockers in a common vertical plane, a cabinet in said refrigerator room adapted to enclose a user and having a vertical wall constructed with an opening to provide access to the lockers, said cabinet being movable to bring said wall into sealing abutment with the faces of said lockers, and a strip of heat sealing material surrounding the opening in said wall of the cabinet.

15. In combination, a refrigerator locker room, a plurality of laterally and vertically disposed lockers therein with the faces of said lockers in a common vertical plane, and a cabinet in said refrigerator room adapted to enclose a user and having a transparent vertical wall constructed with an opening to provide access to the lockers, said cabinet being movable to bring said wall into sealing abutment with the faces of said lockers.

16. In combination, a refrigerator locker room, a plurality of laterally and vertically disposed lockers therein with the faces of said lockers in a common vertical plane, and a cabinet in said refrigerator room adapted to enclose a user and having a vertical side wall constructed with an opening to provide access to the lockers, and another wall having a door therein, said cabinet being movable to bring said side wall into sealing abutment with the faces of said lockers.

17. In combination, a refrigerator locker room, a plurality of laterally and vertically disposed lockers therein with the faces of said lockers in a common vertical plane, a cabinet in said refrigerator room having a vertical wall constructed with vertically spaced openings to provide access to the lockers, said cabinet being movable to bring said wall into sealing abutment with the faces of said lockers, and movable means within the cabinet to enable the user to reach lockers through the openings at different heights.

18. In combination, a refrigerator locker room, a plurality of laterally and vertically disposed lockers therein with the faces of said lockers in a common vertical plane, and a cabinet in said refrigerator room adapted to enclose a user and having a vertical side wall constructed with an opening to provide access to the lockers, and another wall with a door therein, said cabinet being movable to bring said side wall into sealing abutment with the faces of said lockers and constructed with an open bottom to enable a user in the cabinet to move the cabinet by walking on the floor of the refrigerator room, and heat sealing means between the lower edge of the cabinet and said floor.

ROLAND H. SLOAN, JR.